Figure 1:
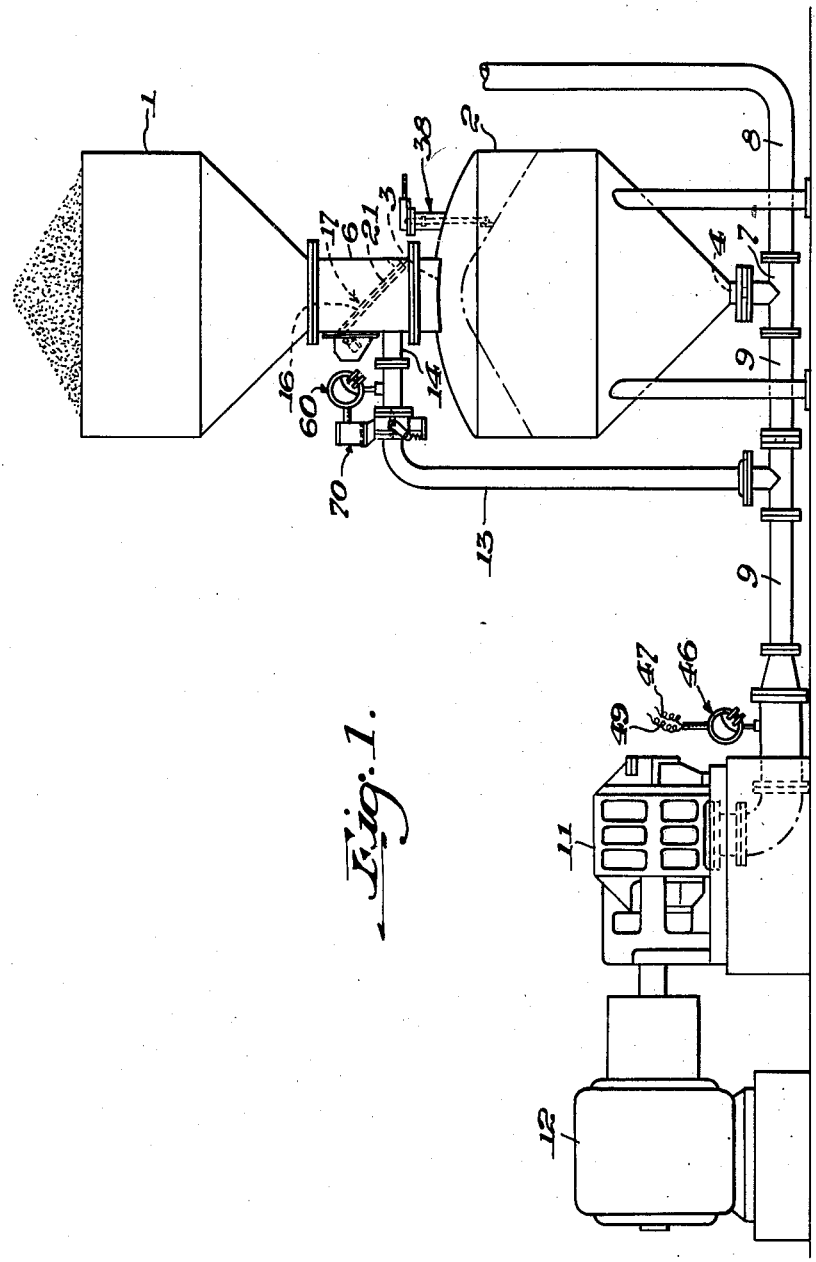

Aug. 28, 1951     M. J. BOZICH     2,565,946
PNEUMATIC SYSTEM FOR CONVEYING DISCRETE MATERIAL
Filed Jan. 19, 1949     3 Sheets-Sheet 1

INVENTOR.
MICHAEL J. BOZICH
BY
Brown, Critchlow, Flick & Peckham
his ATTORNEYS.

Aug. 28, 1951 M. J. BOZICH 2,565,946
PNEUMATIC SYSTEM FOR CONVEYING DISCRETE MATERIAL
Filed Jan. 19, 1949 3 Sheets-Sheet 2

INVENTOR
MICHAEL J. BOZICH.
BY
Brown, Critchlow, Flick & Peckham
his
ATTORNEYS.

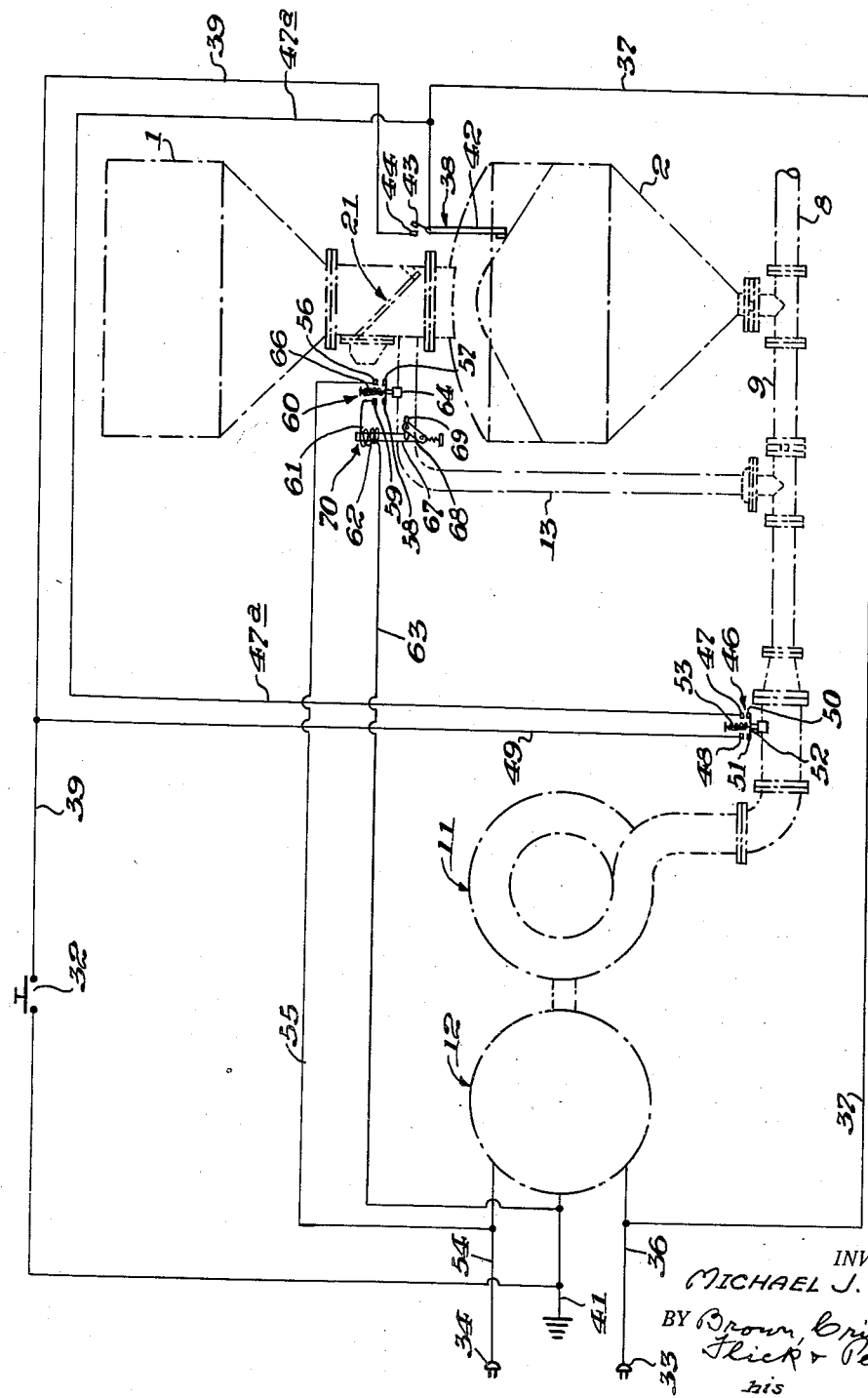

Patented Aug. 28, 1951

2,565,946

UNITED STATES PATENT OFFICE 2,565,946

PNEUMATIC SYSTEM FOR CONVEYING DISCRETE MATERIAL

Michael J. Bozich, Pittsburgh, Pa.

Application January 19, 1949, Serial No. 71,604

9 Claims. (Cl. 302—55)

This invention relates to pneumatic systems of conveying material in discrete form, such as glass batch, coal, foodstuffs, chemicals and other materials of a lumpy, granular or powdered character. In particular, the invention relates to low pressure systems for conveying such materials to storage, loading or treating stations, and to certain controls for regulating the flow of material as well as the pneumatic pressure.

In systems of the type herein contemplated, discrete material is placed in a hopper, the bottom of which is provided with a discharge opening that communicates with a conduit in which the material in the hopper is pneumatically conveyed to its destination. The material in the hopper is forced through this discharge opening into the conveying conduit by means of an air blast supplied to the hopper above the material, and the movement of the material in the conveying conduit is effected by an air blast supplied to this conduit anteriorly from its connection with the hopper, these air blasts usually being created by customary blower and blower motor mechanism. When the hopper is empty, or at such other times as it is desired to supply it with material, the air blasts mentioned above are shut off and additional material is poured into it.

As will be recognized, the practicability of such conveying systems is dependent, to a considerable extent, upon the speed by which the material is conveyed and, also, upon the economy which can be effected by using a low pressure to obtain such speed. One disadvantage of a number of such prior conveying systems is that, to obtain the desired speed, they require the use of high air pressures and, consequently, considerable power to create such pressures. On the other hand, if low air pressures are used, the conveying speed is proportionately reduced. Further, most of the prior systems required a manual starting and stopping of the blower motor to permit additional material to be supplied to the hopper, and this, in itself, occupied unnecessary time. Also, in a number of instances a manual feeding or pouring of material into the hopper was required, while others utilized a manually operable valve which required an operator to open or close it to permit a flow of material into the hopper from some source, such as another delivery hopper. It is obvious that all of these manual operations decreased the efficiency of such systems.

Another related disadvantage of prior systems results from the manner in which discrete material usually flows, or empties, from a hopper through a bottom discharge opening, reference here being made to the phenomenon known as the "arching," or "hanging-up" of the material which results in the materials maintaining a certain angle of repose, or balance, until upset by the gradual emptying, at which time there is a sudden surge, or slipping, of a large mass toward the discharge opening. The same thing can be noticed when a pile of granular or powdered materials resting, for instance, in an open lot is being shoveled away, portions of the pile hanging together until a point is reached where some slight disturbance produces a sudden disruption and fall of that portion. In delivery hoppers of conveying systems, this condition becomes particularly objectionable since such a sudden surge of the material to and through the discharge opening requires the blower to move a considerably increased amount of material, which, in turn, may put an excessive load upon the blower. Further, such sudden surges of material may overload the conveying conduit through which the material must move and produce a jamming-up within this conduit which may necessitate complete dismantling and drainage of all the material from the equipment.

It is, therefore, one object of this invention to provide a pneumatic system for conveying materials in discrete form, which is capable of utilizing a low pressure to deliver the materials to their destination at an unusually fast rate.

Other objects are to provide a system, in accordance with the above object, in which conveying speed and efficiency are increased by automatically controlling the feeding of the material into the delivery hopper and by the provision of means which automatically shut off the supply of air after a load has been conveyed from the hopper and which automatically start the blower when the automatic feeding mechanism has refilled the hopper.

A further object is to provide such a system in which the pressure in the hopper and the air supply conduits is maintained substantially constant regardless of sudden surges caused by the previously described arching or hanging up.

According to the invention, the material handling and air supplying apparatus includes a pair of communicating hoppers one disposed above the other, the upper hopper being open at its top to permit material to be poured into it and the lower being closed except for a material-receiving opening provided at its top and a material-discharge opening at its bottom. The discharge opening communicates with a pipe line, or conduit, through which material in the lower hopper is conveyed to its storage place, or the like. Anteriorly of the connection between the discharge opening and this material-conveying conduit, there is connected an air supply passage through which compressed air from a suitable source is projected against the material in the conveying conduit to cause this material to move to its destination. The force for driving the material within the delivery hopper into the conveying conduit is supplied by air pressure delivered by an air supply condit which communicates with the receiving opening in such a way that compressed air is projected against the top of the material in that hopper.

The mechanism for permitting automatic feeding, or refilling, of the lower, delivery hopper preferably includes a valve casing which interconnects the upper and lower hoppers and, within the casing, there is mounted a downwardly inclined valve seat and a platelike valve adapted to close against this seat and shut off the flow of the material. Most suitably, the valve is pivotally mounted at its upper edge in the casing below and adjacent to the upper end of the seat, mechanical means, such as a counterbalancing weight, is used to swing the valve upwardly towards its closed position against the seat. Also, the air supply line is fitted into an opening provided in this casing, and this opening is in approximate axial alignment with the lower face of the valve so that, when air is projected from the supply line through the opening it drives against this valve face and swings the valve into a firmly closed position. Because of this stream of air driving against the valve, as well as pressure created within the lower hopper due to air being forced therein, the valve will remain firmly seated until the supply of material in the hopper has been evacuated. At this time, the supply of air, rushing freely from the supply lines through the hopper and out through the conveying conduit, is insufficient to hold the valve closed against the weight of material in the upper hopper, and the valve swings open to fill the lower hopper.

Further, it is preferable to provide means to shut down, or vent, the blower when the valve is swung open, since, otherwise, air would drive up through the material in the upper hopper and cause large volumes of material to be blown out into the atmosphere. For this purpose it is desirable to mount a normally-open, pressure switch in one of the air supply conduits, the switch being so set that when the evacuation is completed, and when the air pressure in the conduits is that of an uninterrupted flow of air, the switch opens thereby opening a circuit which either causes the motor to stop or the blower to vent to the atmosphere. On the other hand, when the compressed air is performing work by conveying material, the back pressure built up within the air supply line is sufficient to close this pressure switch and continue the supply of compressed air.

Another desirable feature of the invention is the provision of means to initially and automatically start the blower motor when the lower, or delivery, hopper is filled to the desired extent. Preferably, such means is a level switch actuated by a pivotal lever mounted in the hopper in such a position that when the material reaches a certain level the lever is swung to close an electric circuit to the motor and the blower started. As presently conceived, this level switch will again open when some of the material has been conveyed from the hopper, but the electrical circuit arrangement is such that, at this time, the air supply conduit pressure switch, mentioned above, keeps the motor running.

A further advantageous feature of the invention, which operates to maintain a substantially constant air pressure within the hopper, is the provision of another pressure switch, preferably mounted in the hopper air supply conduit, this switch being electrically connected to a valve which, when the switch closes, is swung to shut off the flow of compressed air into the top of the hopper. As a result, if any sudden surge of material resulting from the previously mentioned "arch" occurs, the resulting increase of air pressure created in the air supply conduits causes this pressure switch to close and, as a result, the valve moves to a position in which the flow of air through the supply line is shut off. These several features outlined above cooperate with each other to provide an unusually fast and efficient conveying operation in which no manual intervention is necessary and, further, a system in which excessive loads for the blower are avoided.

Figure 3:
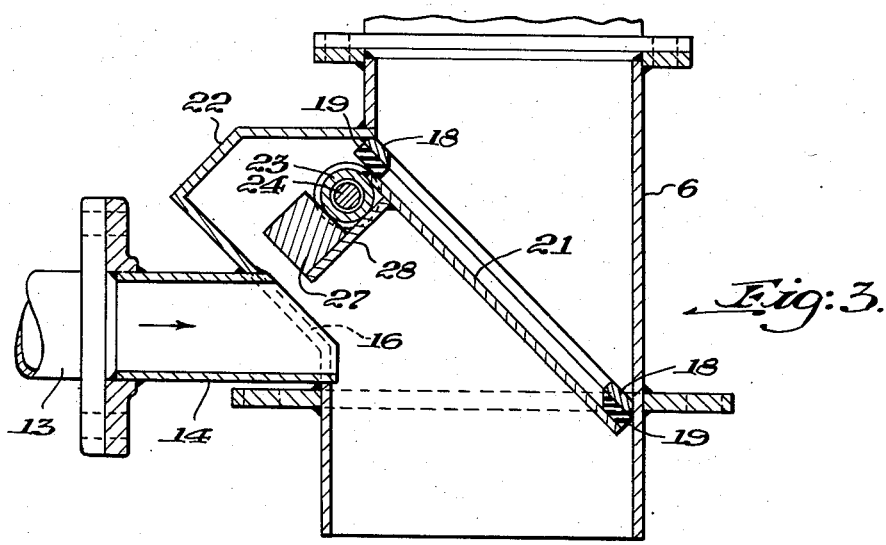
Figure 2:
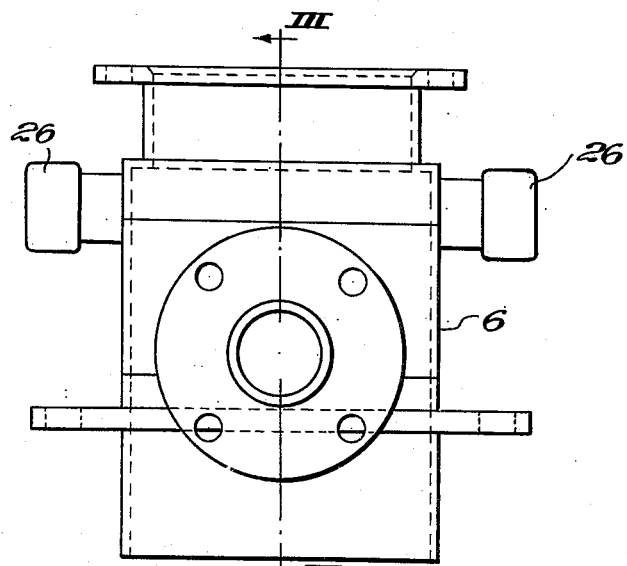

The invention is illustrated in the accompanying drawings in which Fig. 1 is a somewhat diagrammatic side elevation of the material conveying and air supplying and controlling apparatus provided by the invention; Fig. 2 a left side elevation to enlarged scale of a check-valve structure at the top of the lower hopper shown in Fig. 1; Fig. 3 a vertical central section taken on the line III—III of Fig. 2; and Fig. 4 a diagrammatic view in which suitable circuits for actuating the various air pressure controls are shown in full line and the air-supplying and material-handling apparatus indicated in dot and dash lines.

Referring to the drawings, and particularly to Fig. 1, the material conveying apparatus consists of a pair of hoppers 1 and 2 arranged vertically one above the other, upper hopper 1 being designated a supply hopper and having an open top to permit the material to be poured therein. However, it should be understood that other means equivalent to upper hopper 1 could be used to supply the material to be conveyed, and the subsequent use of the term "supply hopper," both in the description and the appended claims is intended to be sufficiently broad to cover such equivalent means. Lower hopper 2, designated as a delivery hopper, is a bin provided at its top with a material-receiving opening 3 and at its bottom with a discharge opening 4, the two hoppers being placed in communication, by a casing 6 which is disposed between them and which, preferably, is rectangular in cross section. Connected to discharge opening 4, is a T-section pipe 7 which, at its right-hand end, is connected to a conveying conduit 8 that conveys material to the desired place of delivery, while, at its left end, the T-section is connected to an air supply passage 9. Passage 9, in turn, communicates with a blower 11 of any standard construction, the power for such blower being supplied by an electrical motor 12.

To effect evacuation of a load of discrete material contained in delivery hopper 2, another air supply conduit 13 is connected, by a suitable T-section or the like, into air passage 9 anteriorly of its connection with discharge opening 4, this conduit leading vertically upwardly and then horizontally where it is connected to a pipe coupling 14 which is fitted tightly into an air supply opening 16, provided at the side of rectangular casing 6. Hopper 2 is sealed at its upper end, above opening 16, by means of check-valve mechanism 17 which will be described later.

With this arrangement, material conveying is carried on by supplying compressed air from the blower to air supply line 13 and downwardly onto the load within the hopper 2 so as to force the load out through discharge opening 4 and into conveying conduit 8. The actual conveying is carried out by compressed air being projected through air passage 9 against the material discharged into conveying conduit 8 to carry the material to its desired place of delivery.

Check-valve mechanism 17, referred to above, operates to open automatically and effect a refilling of hopper 2 when the hopper has been evacuated and, also, to close automatically by the projection of compressed air against it through casing opening 16. Specifically, as shown in Fig. 3, the interior wall of the casing mounts a downwardly inclined valve seat 18 that is provided with a gasket 19 to seal the interior of hopper 1 against the escape of air when the valve mechanism is closed. The vertical passage through the casing which communicates hoppers 1 and 2 is adapted to be closed by a platelike valve 21 which is pivotally mounted on a horizontal axis in laterally offset section 22 of the valve casing. As shown, the upper edge of the valve is preferably welded to an eye 23 which receives a pintle 24 that extends from one to the other side of the valve casing, and is supported at its ends by sleeves 26 (Fig. 2). Adjacent to its pivotal axis, the valve is so counterweighted that it is normally urged towards closed position. As shown, this may be done by a weight 27 attached to a plate 28 which, in turn, is welded to the bottom of valve 21 and to eye 23. Preferably, the counterweight is so balanced that, when no material weight or air pressure is acting on valve 21, the valve swings toward its closed position but leaves an opening between its lower end and gasket 19 of between a quarter inch and one inch, depending upon the particular character of the material being conveyed. The purpose of such an opening is to prevent stray pieces of material becoming caught between the valve and the gasket when the valve is swung to a sealing position, it being apparent that any such caught pieces could prevent a seal being effected which would result in decreased efficiency due to loss of air pressure.

As mentioned above, valve 21 is adapted to be closed by air pressure delivered through air supply line 13 and casing opening 16, and, for this purpose, opening 16 is formed in approximate axial alignment with the lower face of the valve. As a consequence, when the system is supplied with compressed air, this air is projected in a velocity stream against the lower face of the valve and swings the valve to its closed position. Such closed and sealed position then is maintained throughout evacuation of material from hopper 2 by means of this velocity stream and also by air pressure created within this delivery hopper. Preferably, the arrangement is such that, when material is all, or nearly all, evacuated from hopper 2 and conveying conduit 8, the free flowing air passing through the hopper is insufficient to seat the valve against the weight of material in the supply hopper, with the result that the valve swings open and material is automatically fed from supply hopper 1 to delivery hopper 2. In a system such as this, the material may be quickly conveyed by the use of relatively low air pressure, such as three to five pounds per square inch, in the air supply passage 9 and conduit 13.

The remaining features of this invention which broadly consist in various air pressure control mechanisms to increase the speed and efficiency of the system, as well as to prevent excessive loads being placed upon the blower of the system, can best be described and understood by a description of their function in the operation of the conveying apparatus. Generally, these features include three pressure-responsive, electrical switches disposed in a manner to be described and, also, valve mechanism responsive to one of these switches, it being noted that the general structure of such switches and valve is illustrated in Fig. 1, while in the wiring diagram of Fig. 4, they are illustrated diagrammatically with the intent of more clearly showing their function in the conveying cycle.

To commence the conveying, the first step is to close a manual push button switch 32 which is disposed in an electrical circuit including a source of electrical energy into which plugs 33 and 34 are connected, electrical conductors 36 and 37, a normally open automatic switch 38 and another conductor 39 leading to ground line 41 of the motor. It will be noted, however, that the closing of push button switch 32 does not energize the motor since, as stated, normally open switch 38 breaks this circuit. With switch 32 closed, material may be poured or otherwise fed into supply hopper 1, the weight of this material forcing open valve 21 and allowing the material to flow into delivery hopper 2. The level of material in hopper 2 gradually rises until it reaches a point indicated by the dotted lines of Figs. 1 and 2. Any further supply of material then operates to close switch 38 and, consequently, close the circuit through the motor and commence delivery of compressed air from blower 11 into the air supply lines. Switch 38 may be described as a material-level-responsive switch and, as shown in Fig. 4, it includes a swinging lever 42, pivotally mounted on suitable brackets that may be welded to hopper 2, and a contact arm 43 which, when lever 42 is swung by the rising of the material level in the hopper, closes against contact point 44 in the motor circuit. The construction of switch 38 can assume other forms such, for instance, as the common push button type of switch actuated by the movement of lever 42 to close suitably arranged contact points.

As stated, the energizing of motor 12 starts the blower, which immediately creates air pressure which, in driving through opening 16 in casing 6, swings check-valve 21 to a firmly closed position so that no further material can flow into hopper 2. Also, the supply of compressed air flowing through air passage 9 commences delivery of material, which has fallen into conveying conduit 8, to its desired destination. Of course, as the level of the material in hopper 2 is lowered, level switch 38 is permitted to swing back to its normal, vertical, open position. However, before this occurs, the back pressure in air supply line 9, created by the presence of material in the conveying conduit, actuates a line pressure switch 46 and closes a second circuit which is arranged to by-pass level switch 38 and maintain a supply of electrical energy to the motor.

This by-pass circuit includes an electrical conductor 47a that leads from conductor 37 anteriorly of switch 38 and which terminates in a contact point 41 of line pressure switch 46. Switch 46 has another contact point 48 connected to conductor 49 that is electrically connected back into conductor 39 of the first main motor circuit. As shown in Fig. 4, switch 46 also includes another pair of contact points 50 and 51 disposed at either end of contact arm 52, the arm being urged downwardly by a small compression spring 53. This spring has sufficient force to maintain the switch in open position against free flow of compressed air through the air conduits, but not against pressure created when the compressed air is required to perform work by conveying material from the hopper 2. With this arrangement, the moment that conveying commences, due to the closing of level switch 38, switch 46 also closes, so that, when level switch 38 again swings open, due to conveying of some material from the hopper, the electrical energy by-passes switch 38 and continues to ground so as to maintain the operation of the blower. As mentioned above, pressure switch 46, as shown in Fig. 4, is merely one operable form, and other types, such as a Bourdon tube pressure switch, indicated in Fig. 1, would be, at least, as satisfactory.

It has been stated that switch 46 is closed only during conveying of material, although it could be set so as to open when only a small amount of material remains to be conveyed. When either condition pertains, it will be understood that switch 46 opens thereby breaking both motor circuits so that the motor and blower are shut off and no air supplied to the system. However, if considered desirable, switch 46 could be used to vent air from the blower to atmosphere and thereby shut off the air supply.

The shutting off of the air supply has two effects. First, it reduces the pressure in hopper 2 and eliminates the velocity stream of air against check-valve 21 so that this valve may swing open and material flow to refill hopper 2, this refilling continuing until the material reaches a level at which it again actuates level valve 38 to commence another conveying cycle. Also, it is of importance to note that the shutting off of the velocity stream of air into casing 6 has an additional advantage, since if such did not occur, the air would drive upwardly through open valve 21 and blow any powder or dust contained in the material in the supply hopper into the surrounding atmosphere. However, the principal advantage inherent in the controlling of the filling of delivery hopper 2, as well as the automatic switching on and off of the air supply, lies in the economies effected by the elimination of manual intervention, this, in turn, permitting increased speed of delivery in a low pressure conveying system.

Another feature of the invention, which has been generally discussed, is the provision of means for so controlling the pressure in hopper 2 that sudden surges of material out through the discharge opening do not impose an excessive load on the blower motor, and do not cause conveying conduit 8 to become jammed. Such means include another pressure switch 60 arranged to close valve mechanism 70, the switch, preferably being a pressure-responsive Bourdon tube type, and the valve mechanism being a common form of a solenoid-operated, butterfly valve, both structurally indicated in Fig. 1.

However, any type of switch and valve which accomplishes the desired result may be used and, to simplify description, the type indicated in Fig. 4, will be described. Referring thereto, it is seen that the switch and valve mechanism are arranged in an electrical circuit which includes a source of electrical energy into which plug 34 is electrically connected, and, also, conduits 54 and 55, the latter terminating in a contact point 56 of switch 60. The circuit is completed through other contact points 57, 58 and 59, an electrical conductor 61 that leads to a solenoid 62 of valve mechanism 70 and another conductor 63 back to ground. Switch 60 is the same as the previously described air supply line switch 46 in that its contacts 57 and 58 are mounted on a contact arm which is carried by a plunger 64 extending into air supply conduit 13, and, normally, the switch is held open by a compression spring 66.

Valve mechanism 70 also includes an armature 67 which is pivotally connected by a link 68 to a circular valve plate 69 in such a manner that, when the solenoid is energized to draw the armature upwardly, the valve is swung to completely shut off flow of compressed air through air supply conduit 13. Of course, when the solenoid is not energized, valve 69 will be in the position shown in Fig. 4.

The operation of this hopper pressure controlling valve can best be understood by a specific illustration in which it will be assumed that the system is designed to convey 200 pounds of material per minute at approximately five pounds pressure for a distance of 1000 feet. In such event, as the material is flowing out of hopper 2, the previously-mentioned "arch" may occur and may suddenly break and cause appoximately twice the amount of material to be delivered into the conveying conduit. In other words, instead of 200 pounds per minute for which the system is designed, the conveyor now is compelled to convey 400 pounds per minute and this, in turn, will force the blower to deliver a pressure of ten pounds per square inch which is an excessive and uneconomical load on the blower. The present hopper pressure controlling valve does not prevent such arching, but it does prevent the building up of such excessive loads. Thus, in the above illustration, when this arch breaks, an additional pressure is built up within the hopper, as well as within the other air conduits. However, the amount of built-up pressure is controlled by setting pressure switch 60 so that an increase in air pressure in the hopper of one pound closes the switch, thereby energizing solenoid 62 and causing valve 69 to shut off the supply of air pressure to the hopper. When this happens, material is delivered from the hopper to the conveying conduit only by gravity and by the pressure already within the hopper, and, as the hopper continues to empty, the pressure within it returns to its preferred five pounds per square inch, at which time pressure switch 60 again opens and allows air to be supplied to the top of the material in the hopper. Of course, this action takes place each time any unusual surge occurs in hopper 2, it being understood, of course, that sufficient pressure always is maintained within the hopper to keep check-valve 21 closed to shut off additional supply of material from the hopper. Although such valve and switch action is preferred, it will be recognized that it could be reversed and the desired result nevertheless effected. For example, valve 69 could be normally open and switch mechanism 60 normally closed, in which event the arrangement would be such that valve 69 would swing closed, to shut off the air supply, when excessive line pressure opens switch 60.

From the above description it will be recognized that the arrangement of the conveying apparatus as a whole, as well as the particular feeding and air pressure controls, all act together to provide a conveying system which is capable of operating at an unusually low and economical pressure and which, also, is capable of conveying material rapidly and efficiently.

According to the provisions of the patent statutes, I have explained the principle, construction and mode of operation of the invention and have illustrated and described what now is considered to be its best embodiment. However, it is to be understood that, within the scope of the appended claims, the invention may be practiced by other forms than those specifically illustrated and described.

I claim:

1. Apparatus for pneumatically conveying solid materials in discrete form, comprising material-supply and material-delivery hoppers, said latter hopper being provided at its top with a material-receiving opening and at its bottom with a material-discharging opening, a material-conveying conduit communicating with said discharge opening, a valve casing connecting said receiving opening with said supply hopper and mounting an inclined valve seat, a platelike valve pivotally mounted in said casing, mechanical means urging the valve upwardly toward closed position against said seat, said casing being provided with an air supply opening disposed in approximate axial alignment with the lower face of said valve, and an air supply conduit connected into said casing opening to supply a velocity stream of air to said hopper to force said materials therein into said conveying conduit, said stream driving against the lower face of said valve and swinging it into a firmly closed position, whereby flow of material from the supply to the delivery hopper is shut off.

2. Apparatus for pneumatically conveying solid materials in discrete form, comprising material-supply and material-delivery hoppers, said latter hopper being provided at its top with a material-receiving opening and at its bottom with a material-discharging opening, a material-conveying conduit communicating with said discharge opening, an air supply passage for projecting compressed air into said conveying conduit for effecting pneumatic movement of material delivered from said delivery hopper to said conduit, a check-valve casing connecting said receiving opening with said supply hopper and mounting a downwardly inclined valve seat, a platelike valve pivotally mounted at its upper edge in said casing below and adjacent to the upper end of said seat, said valve being counterbalanced to swing upwardly almost to closed position against said seat and said casing being provided with an air supply opening disposed in approximate axial alignment with the lower edge of said valve, and an air supply conduit connected into said casing opening to supply a velocity stream of air to said hopper to force said material into said conveying conduit, said stream driving against the lower edge of said valve and swinging it into a firmly closed position, said position being maintained by said velocity stream and by air pressure built up within said supply hopper.

3. In a system for pneumatically conveying solid materials in discrete form, the combination with conveying apparatus comprising mechanism for supplying compressed air to said system, material-supply and material-delivery hoppers, said latter hopper being provided at its top with a material-receiving opening and at its bottom with a material-discharging opening, a material-conveying conduit communicating with said discharge opening, an air supply passage for projecting compressed air into said conveying conduit for effecting pneumatic movement of material delivered from said delivery hopper to said conduit, a check-valve casing connecting said receiving opening with said supply hopper and mounting a downwardly inclined valve seat, a platelike valve pivotally mounted in said casing, mechanical means urging said valve upwardly towards closed position against said seat, said casing being provided with an air supply opening disposed in approximate axial alignment with the lower face of said valve, and an air supply conduit connected into said casing opening to supply a velocity stream of air to said hopper to force said material therein into said conveying conduit, said stream driving against the lower face of said valve and swinging it into a firmly closed position; of a normally open pressure responsive switch mounted in said air supply system, said switch being arranged to close when a back pressure is created within said system by the presence of material in said conveying conduit and to open when said back pressure is relieved by the evacuation of substantially all of said materials from the conduit, the opening of said switch shutting off said supply of compressed air to said system.

4. In a system for pneumatically conveying solid materials in discrete form, the combination with conveying apparatus comprising mechanism for supplying compressed air to said system, material-supply and material-delivery hoppers, said latter hopper being provided at its top with a material-receiving opening and at its bottom with a material-discharging opening, a material-conveying conduit communicating with said discharge opening, an air supply passage for projecting the compressed air into said conveying conduit for effecting pneumatic movement of material delivered from said delivery hopper to said conduit, a check-valve casing connecting said receiving opening with said supply hopper and mounting a downwardly inclined valve seat, a platelike valve pivotally mounted at its upper edge in said casing below and adjacent to the upper end of said seat, said valve being counterbalanced to swing upwardly almost to closed position against said seat and said casing being provided with an air supply opening disposed in approximate axial alignment with the lower edge of said valve, and an air supply conduit connected into said casing opening for supplying a velocity stream of air to said hopper to force said material into said conveying conduit, said stream driving against the lower edge of said valve and swinging it into a firmly closed position; of a normally open pressure responsive switch mounted in said air supply system, said switch being arranged to close when a back pressure is created within said system by the presence of material in said conveying conduit and to open when said back pressure is relieved by the evacuation of substantially all of said materials from the conduit, the opening of said switch shutting off said supply of compressed air to said system.

5. In a system for pneumatically conveying solid materials in discrete form, the combination with conveying apparatus comprising a motor, a blower driven by said motor, material-supply and material-delivery hoppers, said latter hopper being provided at its top with a material-receiving opening and at its bottom with a material-discharging opening, a material-conveying conduit communicating with said discharge opening, an air supply passage for projecting the compressed air into said conveying conduit for effecting pneumatic movement of material delivered from said delivery hopper to said conduit, a casing connecting said receiving-opening with said supply-hopper, said casing being provided with an air supply opening, an air supply conduit connected into said casing opening for supplying a velocity stream of air to said hopper to force said material therein into said conveying conduit, and normally open check-valve mechanism mounted in said casing for controlling the flow of material from said supply to said delivery hopper, said mechanism being arranged to close and shut off said flow when said compressed air is forcing material from the delivery hopper to the conveying conduit and to open when said supply of compressed air is shut off; of air supply controlling mechanism comprising a normally open switch mounted within the said delivery hopper, an electric circuit connecting said switch with said blower motor, said switch being adapted to close and energize said motor when said discrete material being fed from said supply to said delivery hopper reaches a predetermined level whereupon compressed air is supplied to said air supply system to convey said materials from the delivery hopper, and a normally open pressure responsive switch mounted in said air supply system, said switch being arranged to close and maintain motor energization when a back pressure is created within said system by the presence of material in said conveying conduit and to open when said back pressure is relieved by the evacuation of substantially all of said materials from the conduit, the opening of said switch shutting off said supply of compressed air to said system, whereupon said valve mechanism is permitted to open to refill said hopper.

6. In a system for pneumatically conveying solid materials in discrete form, the combination with conveying apparatus comprising a motor, a blower driven by said motor, material-supply and material-delivery hoppers, said latter hopper being provided at its top with a material-receiving opening and at its bottom with a material-discharging opening, a material-conveying conduit communicating with said discharge opening, an air supply passage for projecting the compressed air into said conveying conduit for effecting pneumatic movement of material delivered from said delivery hopper to said conduit, a casing connecting said receiving-opening with said supply-hopper, said casing being provided with an air supply opening, an air supply conduit connected into said casing opening for supplying a velocity stream of air to said hopper to force said material therein into said conveying conduit, and normally open check-valve mechanism mounted in said casing for controlling the flow of material from said supply to said delivery hopper, said mechanism being arranged to close and shut off said flow when said compressed air is forcing material from the delivery hopper to the conveying conduit and to open when said supply of compressed air is shut off; of air supply controlling mechanism comprising a normally open switch mounted within the said delivery hopper, an electric circuit connecting said switch with said blower motor, said switch being adapted to close and energize said motor when said discrete material fed from said supply to said delivery hopper reaches a predetermined level whereupon compressed air is supplied to said air supply system to convey said material from said delivery hopper, an electrical conductor connected into said delivery hopper switch circuit, said conductor by-passing said hopper switch, a normally open pressure responsive switch for interrupting flow through said conductor, said switch being mounted in said air supply system and being arranged to close and maintain said motor energization when said material is being conveyed through said conveying conduit and to open and shut off said supply of compressed air when substantially all of said materials have been conveyed from the delivery hopper.

7. In a system for pneumatically conveying solid materials in discrete form, the combination with conveying apparatus comprising communicating material-supply and material-delivery hoppers, said latter hopper having material-receiving and material-discharging openings, a material-conveying conduit communicating with said discharge opening, a source of compressed air, an air passage communicating with said conveying conduit for projecting compressed air into said conduit for effecting pneumatic movement of material delivered from said delivery hopper to said conduit, an air supply conduit connected between said source and said delivery hopper for projecting air into said hopper for forcing material therein into said conveying conduit, and material flow control mechanism disposed between said two hoppers for intermittently permitting refilling of said delivery hopper; of delivery hopper pressure-regulating means comprising a switch and a valve mounted in said air supply conduit, said switch being responsive to the air pressure in the delivery hopper, and said valve being responsive to the opening and closing of said switch to alternately shut off and permit the flow of air into said delivery hopper.

8. In a system for pneumatically conveying solid materials in discrete form, the combination with conveying apparatus comprising communicating material-supply and material-delivery hoppers, said latter hopper having material-receiving and material-discharging openings, a material-conveying conduit communicating with said discharge opening, a source of compressed air, an air passage communicating with said conveying conduit for projecting compressed air into said conduit for effecting pneumatic movement of material delivered from said delivery hopper to said conduit, an air supply conduit connected between said source and said delivery hopper for projecting air into said hopper for forcing material therein into said conveying conduit, and material flow control mechanism disposed between said two hoppers for intermittently permitting refilling of said delivery hopper; of delivery hopper pressure-regulating means comprising a pressure switch responsive to the air pressure in said delivery hopper, a source of electric energy, a normally open valve disposed in said air supply conduit and operable to shut off said supply of air when seated, electrical means for actuating said valve, and an electrical circuit connecting said switch and said valve operating means with said source of electrical energy, said switch being so set that when the pressure in said delivery hopper exceeds a predetermined amount the excess pressure closes the circuit through the switch and valve actuating means whereupon said valve moves and shuts off the flow of air into the delivery hopper, said switch also opening said circuit when said air pressure returns to said predetermined amount.

9. In a system for pneumatically conveying solid materials in discrete form, the combination with conveying apparatus comprising communicating material-supply and material-delivery hoppers, said latter hopper having material-receiving and material-discharging openings, a material-conveying conduit communicating with said discharge opening, a source of compressed air, an air passage communicating with said conveying conduit for projecting compressed air into said conduit for effecting pneumatic movement of material delivered from said delivery hopper to said conduit, an air supply conduit connected between said source and said delivery hopper for projecting air into said hopper for forcing material therein into said conveying conduit, and normally open check valve mechanism mounted between said hoppers for controlling the flow of material from said delivery to said supply hopper, said mechanism being arranged to close and shut off said flow when compressed air is forcing material from the delivery hopper to the conveying conduit and to open when said supply of compressed air is shut off; of delivery hopper pressure-regulating means comprising a pressure switch responsive to the air pressure in said delivery hopper, a source of electric energy, a normally open valve disposed in said air supply conduit and operable to shut off said supply of air when seated, electrical means for actuating said valve, and an electrical circuit connecting said switch and said valve operating means with said source of electrical energy, said switch being so set that when the pressure in said delivery hopper exceeds a predetermined amount the excess pressure closes the circuit through the switch and valve actuating means whereupon said valve moves and shuts off the flow of air into the delivery hopper, said switch also opening said circuit when said air pressure returns to said predetermined amount.

MICHAEL J. BOZICH.

REFERENCES CITED

The following references are of record in the file of this patent:

UNITED STATES PATENTS

| Number | Name | Date |
|---|---|---|
| 951,754 | Buzzell | Mar. 8, 1910 |
| 1,935,843 | Goebels | Nov. 21, 1933 |

FOREIGN PATENTS

| Number | Country | Date |
|---|---|---|
| 764,761 | France | May 28, 1934 |